O. S. MUNTZ.
SHOCK ABSORBING CONTAINER.
APPLICATION FILED MAY 29, 1919.

1,328,758.

Patented Jan. 20, 1920.
2 SHEETS—SHEET 1.

Witness:
Harry S. Gaither

Inventor:
Otto S. Muntz
by Major Brown Atty

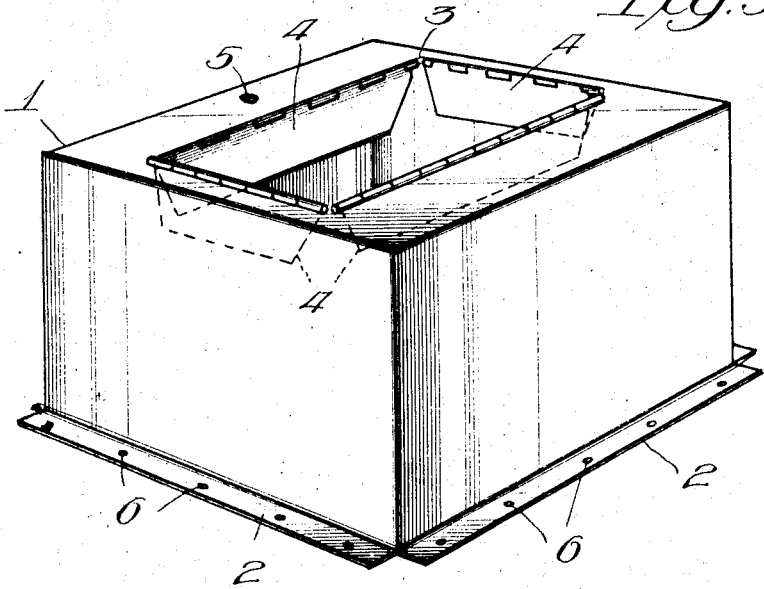
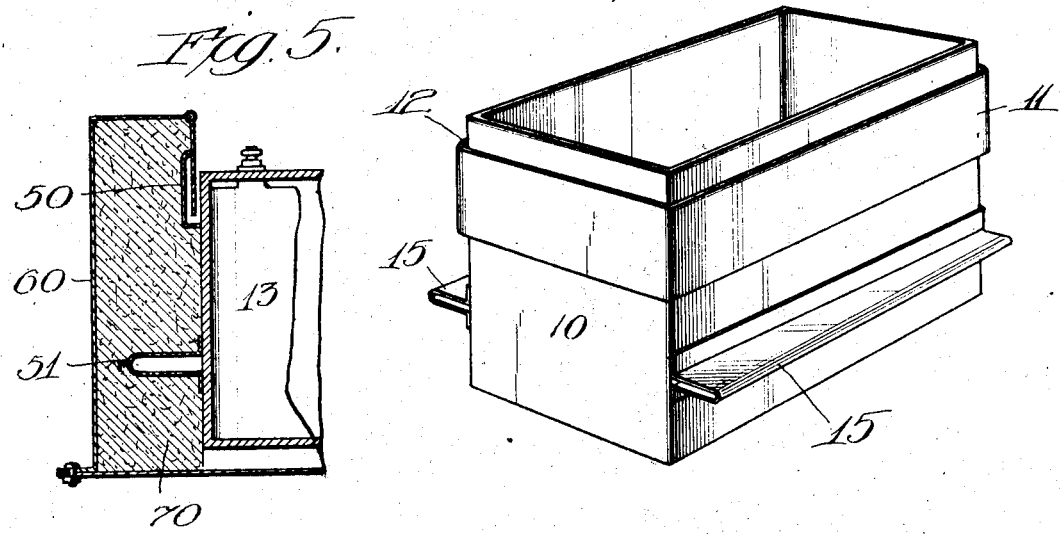

UNITED STATES PATENT OFFICE.

OTTO S. MUNTZ, OF DUBUQUE, IOWA.

SHOCK-ABSORBING CONTAINER.

1,328,758. Specification of Letters Patent. Patented Jan. 20, 1920.

Application filed May 29, 1919. Serial No. 300,703.

*To all whom it may concern:*

Be it known that I, OTTO S. MUNTZ, a citizen of the United States, and a resident of Dubuque, in the county of Dubuque and State of Iowa, have invented certain new and useful Improvements in Shock-Absorbing Containers; and I do hereby declare that the following is a full, clear, and exact description thereof, reference being had to the accompanying drawings, and to the letters of reference marked thereon, which form a part of this specification.

My invention relates to containers and more especially to a shock absorbing container for holding a battery in such manner that vibration, jolts, shocks and jars to which the container is exposed will not be transmitted in their full force to the battery itself.

My improved container is especially adapted for use on automobiles in carrying starting, lighting or ignition batteries, since these batteries, in order to give the maximum energy for the minimum weight and size, are usually constructed with thin, brittle grids or plates, and housed in jars made of glass, thin vulcanized rubber, or similar material which cannot be exposed to severe shocks or jars without breaking. The jolts and shocks to which an automobile is subjected in ordinary usage make it highly important that the batteries used thereon be carried in containers which will protect them from the vibration and jars.

A device embodying the principles of the present invention is illustrated in the accompanying drawings in which:

Fig. 3 is a perspective view of the outer casing with the inner receptacle and battery removed.

Fig. 4 is a perspective view of the inner receptacle with the battery removed.

Fig. 5 is a fragmentary vertical section of a modified form of the device.

Figure 1:
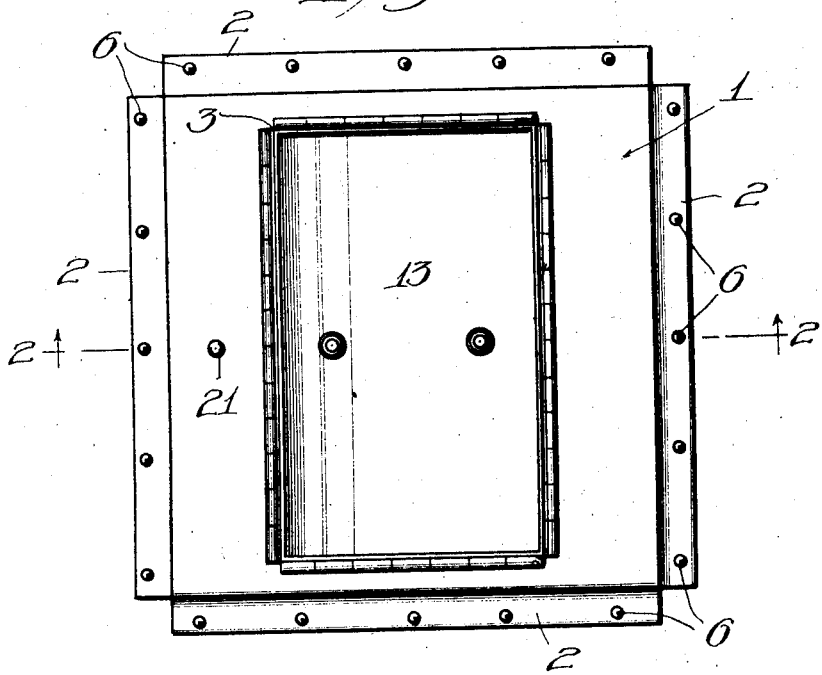
Figure 1 is a top plan view of my improved container showing a battery therein.

In that form of the invention shown in said drawings, I have chosen to illustrate an embodiment designed especially to carry a battery, wherein 1 indicates a rectangular outer shell or casing open at the bottom and having flanges 2, 2, bent outwardly at right angles to the casing walls. Through the flanges 2, 2 are holes 6, 6. In the top of the outer shell or casing 1 is a rectangular opening 3 somewhat smaller than the top surface. Hinged to the edges of this opening and depending therefrom are four vanes 4, 4. To one side of the opening 3 is a small circular opening 5 for a purpose explained hereinafter.

A rectangular inner container 10 (best shown in Fig. 4) is provided for holding the battery. This container is closed on its four sides and its bottom, but is open at the top. It is just large enough so that the battery 13 will fit into it securely. Its top edges form a rectangle, slightly smaller than the opening 3 in the top of the outer shell or casing 1. On the outside of the inner container 10, extending entirely around it, near its upper edge, close to and parallel with its walls is a vertical band or strap 11. The bottom edge of the vertical band or strap 11 is bent inwardly (preferably at a right angle), and is joined to the walls of the inner container, so that there is formed entirely around the container near its upper edge, the vertical space or slot 12 between its walls and the band 11. On the outside of two opposite walls of the inner container 10 near the bottom are two horizontally projecting flanges 15, 15.

The inner container 10 is inserted into the outer casing 1 from the bottom (best shown in Fig. 2), the vanes 4, 4, being allowed to hang down in the space or slot 12, and the flanges 15, 15 reaching about two thirds of the distance from the walls of the inner container to the parallel walls of the outer casing. The inner container is of such a height and the band 11 is so arranged that when the top edge of the container is even with the top surface of the outer shell or casing, the bottom of the container will be slightly above the bottom edges of the walls of the outer casing, and the vanes 4, 4 will not quite reach the bottom of the slot 12.

The space entirely around the inner container between it and the outer shell or casing 1 is filled, in the preferred form illustrated, by an inflated rubber tube 20 which has a filling valve with cap 21, projecting through the opening 5 in the upper surface of the outer casing. The bottom of the outer shell or casing 1 is closed by the bottom plate 22 and is adapted to be bolted to the flanges 2, 2, by means of bolts through the holes 6, 6, or otherwise. The space between the bottom of the inner container and the bottom plate 22 is sufficient so that the tube 20 will project into it, when inflated, as indicated at 30, 30, forming pneumatic cushions under the container.

Figure 2:
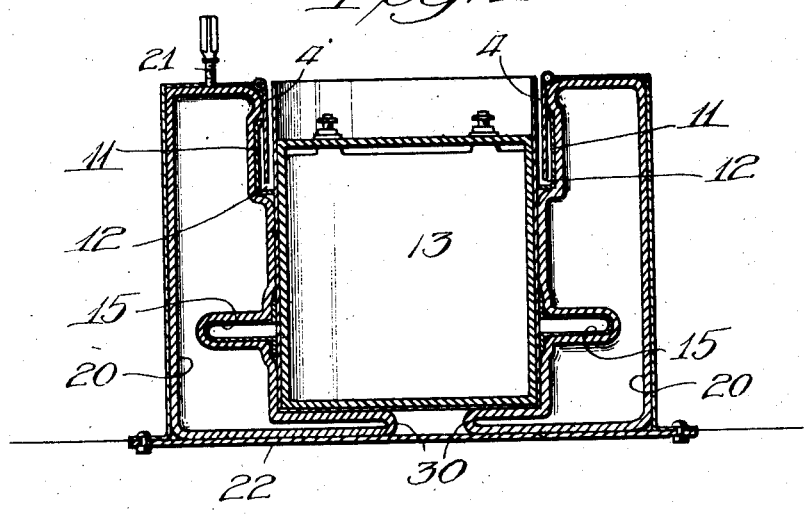
Fig. 2 is a vertical section on the line 2—2 of Fig. 1, looking in the direction indicated by the arrows.

In the operation of the device, the parts are assembled as shown in Fig. 2, the battery is placed in the inner container 10 and the tube 20 is inflated until there is sufficient pressure to hold the inner container off of the bottom plate 22.

The compressed air in the tube 20 between the walls of the container 10 and the outer shell or casing 1 and between the bottom of the container and the bottom plate 22 forms pneumatic cushions which will absorb all shocks to which the device is exposed and prevent them from being transmitted to the inner container carrying the battery 13. The flanges 15, 15, being overlapped on their upper and lower surfaces by the tube 20 filled with compressed air further assist in the absorption of up and down shocks to which the device may be exposed and prevent them from being transmitted in their full intensity to the inner container.

The ends of the vanes 4, 4, by engaging the bottom of the slot 12, will limit the upward movement of the inner container, and movement to the sides will be limited by their jamming in the slot.

In Fig. 5, I have shown a modified form of the device, in which the inner container 10 is dispensed with and a band 50 similar to the band 11 is fastened directly to the walls of the battery itself and horizontally projecting plates 51 similar to those indicated at 15, 15, likewise are attached to the battery itself. In this form of the device, I have shown, as a further modification of the invention, the space between the battery and outer casing 60 filled with any suitable resilient, or elastic material 70 such as rubber, solidified oil or the like, instead of the tube 20.

It is evident that without detracting from the spirit of my invention, instead of a device carrying a battery, several devices may be employed, each adapted to carry a single cell of a battery. It is, also, manifest that the container of my invention may be employed in uses other than that described, as for example, in carrying explosives and other articles which may become injured by vibration or transmission jars and shocks or which might cause injury by explosion.

I claim as my invention:

1. A shock absorbing container, comprising an outer casing, an inner receptacle having projecting flanges and resilient flange supporting means in the casing, said means comprising a fluid under pressure.

2. A shock absorbing container, comprising an outer casing, an inner receptacle having projecting flanges and resilient flange supporting means in the casing, said means comprising a tubular, flexible structure containing a fluid under pressure.

3. In a shock absorbing container, the combination of an outer casing having an opening in its top, and containing resilient supporting means, with an inner receptacle adapted to be entered within the casing opening and having laterally extending flanges adapted to be supported by said resilient supporting means without the bottom, sides or ends of the inner receptacle contacting with the bottom or the walls of the casing.

4. In a shock absorbing container, the combination of an outer casing having an opening in its top, and containing resilient supporting means, with an inner receptacle adapted to be entered within the casing opening and having laterally extending flanges adapted to be supported by said resilient supporting means without the bottom, sides or ends of the inner receptacle contacting with the bottom or the walls of the casing, said inner receptacle being also provided with a plurality of recesses in its walls upwardly opening near the top margins thereof, and said casing being provided with vanes hingedly connected with the casing top and downwardly projecting from the margins of the opening therein and resting within the recesses of the inner receptacle.

In testimony that I claim the foregoing as my invention I affix my signature in the presence of two witnesses, this 21st day of May A. D. 1919.

OTTO S. MUNTZ.

Witnesses:
EDWARD L. MUNTZ,
F. O. JACOBSON.